J. Johnson, 2. Sheets. Sheet. 1.

Sewing-Machine Table.

No. 3,961. Reissued May 3. 1870.

Witnesses.

Horace Vansands

Jerry W. Bliss

Inventor.

John Johnson

N. PETERS, PHOTO-LITHOGRAPHER, WASHINGTON, D. C.

2. Sheets, Sheet. 2.

J. Johnson,

Sewing-Machine Table.

No. 3961. Reissued May 3. 1870.

Witnesses.

Horace Vansands

Jonny W. Bliss

Inventor.

John Johnson

N. PETERS, PHOTO-LITHOGRAPHER, WASHINGTON, D. C.

United States Patent Office.

JOHN JOHNSON, OF HARTFORD, CONNECTICUT.

*Letters Patent No.* 72,739, *dated December* 31, 1867; *reissue No.* 3,931, *dated May* 3, 1870.

IMPROVEMENT IN THE CONSTRUCTION OF SEWING-MACHINE COVERS.

The Schedule referred to in these Letters Patent and making part of the same.

*To all whom it may concern:*

Be it known that I, JOHN JOHNSON, of the city and county of Hartford and State of Connecticut, have invented certain new and useful Improvements in the Manufacture of Sewing-Machine Cases; and to enable others skilled in the art to make and use the same, I will proceed to describe.

Heretofore, sewing-machine cases have been made in simple box form, having four sides, of boards, of equal thickness, secured at the angles or corners by a dovetail-joint, miter-joints, or other connections. These covers, thus constructed, frequently warp, spring, or crack, even when made of well-seasoned wood, are often returned to the manufacturer to be repaired, and sometimes required to be replaced by new ones.

The nature of this invention consists in constructing sewing-machine cases in such a manner that they will not be likely to warp, spring, or crack, and yet will be equally as strong and durable as those now ordinarily manufactured, having a more neat and symmetrical appearance, and are cheaper of manufacture, and of making the several parts of the cover in separate, distinct parts, as the top, sides, ends, and base, all in complete readiness for being put together in the most rapid manner when they are wanted for use.

By this improvement I avoid the difficulty of those as heretofore manufactured, and also obtain a great and very decided advantage of having a cover which will admit of being packed away, in detached parts, within a very limited space, so as to economize in room and transportation, and also admit of being put together with the greatest facility, at any time or place, when required.

To effect this I make my cover in the usual form, rectangular, as that probably would be the most desirable shape. The cover is constructed of a frame, in which panels, which compose the sides and ends of the cover, are inserted, the panels of course being made out of much thinner stuff than the frame, and all so arranged that the several parts which comprise the cover may be in readiness to be put together for use, in the manner described, with the greatest facility, the panels being fitted loosely in grooves in the inner edges or surfaces of the parts composing the frame, so that said panels may shrink without the liability of splitting, and swell without straining the frame, or forcing the cover out of proper place or shape.

In the accompanying drawings—

Figure 10:
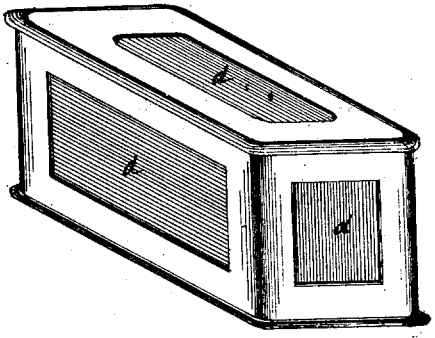

Figure 10, on Sheet B, also shows a perspective view of the case.

Figure 1:
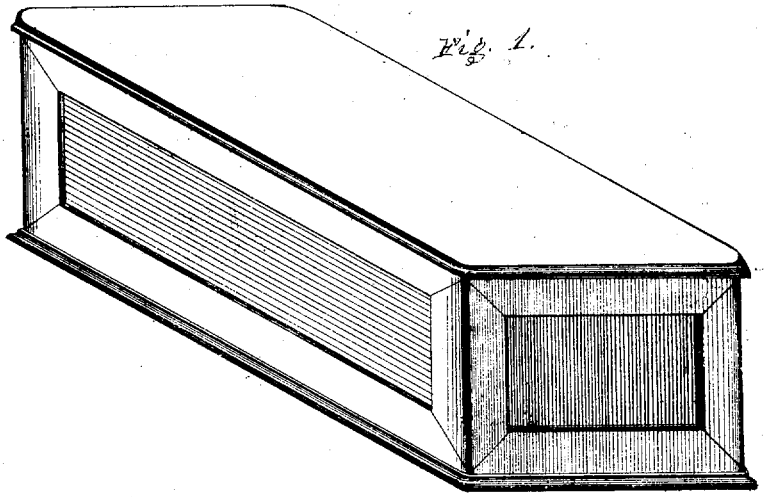
Figure 1 is a perspective elevation.
Figure 3:
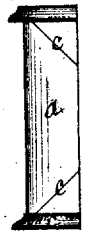
Figure 3 shows an elevation of one corner of the case.
Figure 1:
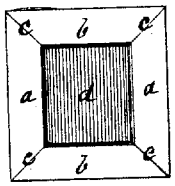
Figure 3:
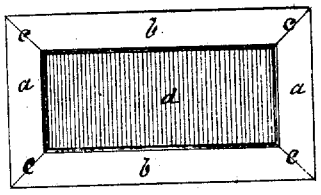
Figure 2:
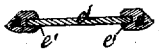
Figure 8:
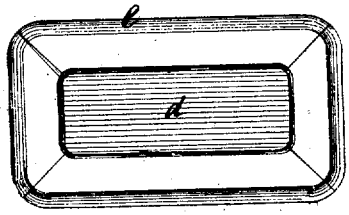

Figures 1, 3, and 8 show a face view of the top, sides, and end of the case, in separate parts.

Figure 2:
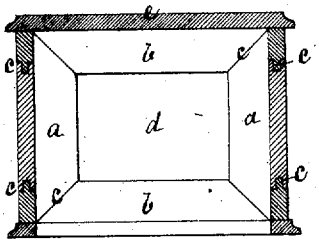
Figure 2 is a sectional end elevation.

Figure 2 is a section view of one end.

Figure 4:
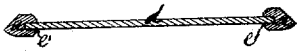

Figure 4 is a section view of one side.

Figure 5:
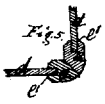

Figure 5 shows how the corner joint is formed for putting together the sides and ends.

Figure 6:
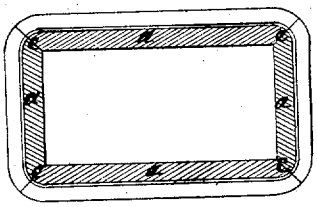

Figure 6 shows the base, detached from the body of the case, also tongue-and-groove miter-joints.

Figure 7:
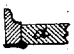

Figure 7 shows a section of the base, connected to the edge of the case.

Figure 9:
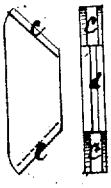

Figure 9 shows a side and edge view of one of the rails of the top of the cover, as originally designed.

Similar letters indicate like parts in each of the figures.

The frame of the cover is composed of uprights or stiles, *a*, of any suitable wood, connected by horizontal rails or cross-pieces, *b*.

These stiles and cross-pieces are properly framed together by tongue-and-groove miter-joints, or other suitable joints, as shown in fig. 3, at *c*.

The frame has a panel, *d*, fitted within it at each side, the panels being of much less thickness than the "stuff" of which the parts composing the frame is made. (See figs. 2 and 4.)

These panels are fitted in grooves, *e'*, made in the inner edges of the frame-work or rails and stiles, as shown in figs. 2 and 4.

In practice I design to have all the parts of the cover so made and fitted that they may be put together at any time and place, where and when they are wanted to be used, without any trouble or difficulty whatever. By this means I can, in shipping or storing the covers in quantities, have the parts of each cover disconnected, so that a large number of covers may be packed within a small compass or space; and, when they have arrived at their destination, or at any time after when desired, they may be put together and made ready for use.

In putting the several parts of a cover permanently together, the stiles and cross-pieces of the frame may be glued in their joints; but the panels *d* are not glued in the grooves formed in the stiles and rails, and the panels, therefore, are allowed to shrink, if they shrink at all, without being liable to check, crack, or split.

The top *e* of the cover may be constructed similarly to its sides, and fitted to the top rails by dowel-pins, or other suitable means.

By this mode of construction I obtain a sewing-machine cover which is free from the principal objections attending those as ordinarily made, checking by shrinkage being avoided, the covers admitting of being compactly stored or packed for transportation, and having a neater and more symmetrical appearance than those as now made.

I am aware that sewing-machine covers have been made with moldings tacked, glued, or otherwise secured to their exterior surface, so as to imitate paneling or panel work. This, however, although giving to a cover nearly the same appearance as one constructed according to my invention, has none of the essential advantages of the latter, as the difficulty attending shrinkage is not avoided, and no economy effected as regards the amount of timber or stuff used in the manufacture.

The stiles and rails may be composed each of one or more longitudinal pieces, connected together by glue, or otherwise. The drawings, however, represent them as being formed each of one piece, and this, as a general thing, I prefer.

Each and all parts of this case are prepared, in readiness for being put together, by mechanism specially adapted for that purpose.

The moldings upon the edge of the cap, the edge of the base, the panel-groove, the tongue-and-groove bevel-joints, are all formed by rapidly-revolving cutters.

The caps, sides, and ends, in all their details, are first prepared to a gauge or pattern, and the cap, sides, and ends are secured together in formers specially made for that purpose. The body of the case, when wanted for use, is glued together upon a former of one fixed, compact size. This former (in size) is made of the length, breadth, and depth required for the inside capacity of the case. This former is constructed with keys, or their mechanical equivalents, by the loosening of which, after the case is secured together thereon, the former can be easily and quickly removed from the case.

The parts which compose this case are glued and clamped together (the sides and ends) upon this former by means of a box or frame-clamp, having screws, or their mechanical equivalents, arranged thereon, so as to produce pressure (always in readiness) at a fixed point.

By this process of manufacturing sewing-machine cases I am enabled to produce them with sunken panels, lighter, stronger, cheaper, and more durable than can be done where they are made of whole, plain boards.

I believe I have thus shown the nature, construction, and advantage of this invention, so as to enable a person skilled in the art to make the same therefrom.

What I claim, and desire to secure by Letters Patent, is—

As an article of manufacture, a paneled sewing-machine case, substantially as described, and made in distinct parts, to store or pack for transportation.

JOHN JOHNSON. [L. S.]

Witnesses:
HORACE VANSANDS,
JEREMY W. BLISS.